(12) United States Patent
Pons

(10) Patent No.: US 11,417,046 B2
(45) Date of Patent: Aug. 16, 2022

(54) VARIATIONAL TECHNIQUE FOR TEXTURING A MESH FROM MULTIPLE VIEWS

(71) Applicant: Bentley Systems, Incorporated, Exton, PA (US)

(72) Inventor: Jean-Philippe Pons, Le Rouret (FR)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 16/725,465

(22) Filed: Dec. 23, 2019

(65) Prior Publication Data

US 2021/0042986 A1 Feb. 11, 2021

(30) Foreign Application Priority Data

Aug. 5, 2019 (EP) .................................. 19306006

(51) Int. Cl.
*G06T 15/04* (2011.01)
*G06K 9/62* (2022.01)
*G06T 17/20* (2006.01)

(52) U.S. Cl.
CPC ............ *G06T 15/04* (2013.01); *G06K 9/6215* (2013.01); *G06T 17/205* (2013.01)

(58) Field of Classification Search
None
See application file for complete search history.

(56) References Cited

U.S. PATENT DOCUMENTS

| 8,861,869 B2* | 10/2014 | Shechtman | G06V 10/757 382/218 |
| 2006/0267978 A1* | 11/2006 | Litke | G06T 17/30 345/419 |
| 2012/0243774 A1* | 9/2012 | Chen | G06T 17/005 382/154 |
| 2014/0009466 A1 | 1/2014 | Tzur et al. | |
| 2015/0286872 A1* | 10/2015 | Medioni | G06T 7/20 382/103 |

(Continued)

OTHER PUBLICATIONS

Sai Bi, Nima Khademi Kalantari, Ravi RamaMoorthi, "Patch-Based Optimization for Image-Based Texture Mapping," 2017, ACM Transactions on Graphics 36(4): Article 106, pp. 11 (Year: 2017).*

(Continued)

*Primary Examiner* — Michael J Cobb
(74) *Attorney, Agent, or Firm* — Cesari and McKenna, LLP; James A. Blanchette

(57) ABSTRACT

In various example embodiments, a variational technique is provided for texturing a polygon mesh based on source images of a scene. The technique combines information from multiple source images to generate a texture map with patches that are the most similar to corresponding patches of the source images. The texture map may be the direct result of an optimization that jointly searches for the texture map and patch correspondence, which is initially unknown. The optimization may use a variational formulation that scores every possible texture map using an energy function that includes a matching term that quantifies how similar patches of the texture map are to the corresponding patches of the source images, and a regularization term that quantifies how complex the patch correspondence is.

16 Claims, 3 Drawing Sheets

(56) References Cited

U.S. PATENT DOCUMENTS

2017/0046868 A1 2/2017 Chernov et al.
2019/0333237 A1* 10/2019 Javidnia ............... G06T 3/4007

OTHER PUBLICATIONS

Natan Micheletti, Jim H Chandler, Stuart N Lane, Structure from Motion (SfM) Photogrammetry, 2015, Geomorphological Techniques, Chapter 2, Sec. 2.2, ISSN: 2047-0371 (Year: 2015).*

Christine A. Jones, Elizabeth Church, "Photogrammetry is for Everyone: Structure-from-motion Software User Experiences in Archaeology," 2020, Journal of Archaeological Science: Reports 30: 102261 (Year: 2020).*

Katherine Shervais, "Structure from Motion (SfM) Photogrammetry Field Methods Manual for Students, version Oct. 18, 2016, retrieved from https://d32ogoqmya1dw8.cloudfront.net/files/getsi/teaching_materials/high-rez-topo/sfm_field_methods_manual.v2.pdf"(Year: 2016).*

Bi, Sai, et al., "Patch-Based Optimization for Image-Based Texture Mapping," ACM, ACM Transactions on Graphics, vol. 36, No. 4, Article 106, Jul. 20, 2017, pp. 1-11.

Dou, Shuyang, et al., "High Quality Texture Mapping for Multiview Reconstruction," IEEE, 2017 $2^{nd}$ International Conference on Multimedia and Image Processing (ICMIP), Mar. 17, 2017, pp. 136-140.

"European Search Report and Written Opinion," European Application No. 19306006.8-1230, Applicant: Bentley Systems, Incorporated, dated Jan. 7, 2020, pp. 1-8.

Shen, Jianbing, et al., "A Unified Framework for Designing Textures Using Energy Optimization," Elsevier Ltd., Elsevier, Pattern Recognition, vol. 43, No. 2, Feb. 2010, pp. 457-469.

Xu, Lin, et al., "A General Texture Mapping Framework for Image-based 3D Modeling," IEEE, ICIP 2010, Proceedings of 2010 IEEE $17^{th}$ International Conference on Image Processing, Hong Kong, China, Sep. 26-29, 2010, pp. 2713-2716.

Allène, Cédric, et al., "Seamless Image-Based Texture Atlases Using Multi-Band Blending," IEEE, 2008 $19^{th}$ International Conference on Pattern Recognition, ICPR 2008, Tampa, FL, USA, Dec. 8-11, 2008, pp. 1-4.

Chauve, Anne-Laure, et al., "Robust Piecewise-Planar 3D Reconstruction and Completion from Large-Scale Unstructured Point Data," IEEE, 2010 IEEE Computer Society Conference on Computer Vision and Pattern Recognition, CVPR 2010, San Francisco, CA, USA, Jun. 13-18, 2010, pp. 1261-1268.

Lempitsky, V. S., et al., "Seamless Mosaicing of Image-Based Texture Maps," IEEE, 2007 IEEE Conference on Computer Vision and Pattern Recognition, CVPR 2007, Minneapolis, MN, USA, Jun. 17-22, 2007, pp. 1-6.

* cited by examiner

VARIATIONAL TECHNIQUE FOR TEXTURING A MESH FROM MULTIPLE VIEWS

RELATED APPLICATION

This Application claims priority to EP Application No. 19306006.8 filed Aug. 5, 2019 by Jean-Philippe Pons titled "A VARIATIONAL TECHNIQUE FOR TEXTURING A MESH FROM MULTIPLE VIEWS", the contents of which are incorporated by reference herein in their entirety.

BACKGROUND

Technical Field

The present disclosure relates generally to techniques for generating a mesh (e.g., a 3D polygon mesh) based on source images (e.g., photographs) of a scene in the physical environment, and more specifically to techniques for texturing such a mesh.

Background Information

It may be useful to generate textures for a mesh (e.g., a 3D polygon mesh) which match the visual appearance of a scene in the physical environment (i.e. a portion of the physical environment that may include infrastructure such as buildings, roads, utility networks, plants, etc., surrounding terrain, and/or other physical features). One application that may generate such textures is a structure from motion (SfM) photogrammetry application, such as the ContextCapture™ application available from Bentley Systems, Inc.

A SfM photogrammetry application may operate to produce a mesh based on source images (e.g., photographs) of a scene captured by a camera. The SfM photogrammetry application may also, or alternatively, utilize point clouds of the scene captured by a LiDAR capture device, or other types of source data, to produce the mesh. The mesh may be composed of facets (e.g., polygons such as triangles) formed from vertices connected by edges. In a typical use of SfM photogrammetry, a number of sequential stages are used to produce the mesh, which may be broadly classified into reconstruction, texturing and annotation, and retouching. Reconstruction may include a draft reconstruction stage that reconstructs discrete parts of surfaces to produce a draft version, a refinement stage that refines the draft version to produce a refined faceted surface, and a simplification stage that simplifies the refined surface to eliminate facets that do not meaningfully contribute. Texturing and annotation may include a texturing stage that generates textures to be shown on the facets so they match the visual appearance of the scene, and a pixel-level mapping stage that generates representations for non-visual data. Retouching may include an editing stage in which the mesh is refined based on user-indicated changes to geometry and textures.

While each stage has a number of technical challenges, the texturing stage can be particularly challenging. Each portion of the scene is typically visible in multiple source images, captured at different times from different positions and orientations, possibly with different exposures. The position and orientation for each source image may not be perfectly known. Further, moving objects (e.g., cars, pedestrians, swaying branches, etc.) may be present in some of the source images despite careful acquisition. As a consequence, selecting a single source image as a texture source for a particular position in the mesh (e.g., based on a simple selection criteria such as distance, angle, color, etc.) may lead to unacceptable artifacts in the resulting textured mesh (e.g., ghosting, misalignments, moving object's erroneously included in textures, etc.). Likewise, simple averaging of source images to produce textures for a position may also lead to unacceptable artifacts.

A number of solutions have been attempted to this problem. One of the more successful approaches has involved using a combinatorial optimization. In this approach, a single source image is still selected as the texture source for a particular position in the mesh. However, rather than use simple selection criteria, a combinatorial optimization is performed with the objective to maximize quality and resolution while limiting the prevalence of artifacts. For example, since some visual discrepancies may occur at boundaries where textures based on different source images meet, the optimization may attempt to achieve a trade-off between the choice of the best image to use for a texture and the consistency of this choice over neighboring positions.

While the above approach may represent an improvement over selection of a single source image as the texture source based on simple selection criteria, and over simple averaging of source images, it still suffers a number of shortcomings. For example, the approach assumes that one of the source images is indeed a "good" source of texture. The larger the area being considered, the less likely this assumption is correct. Further, the approach assumes that one of the source images is "good" in all regards. However, a source image may be highly desirable in some regards, but very undesirable in other regards. For instance, a source image may be desirable because it is not affected by moving object, but undesirable because it is overexposed.

As a result, textured meshes generated using conventional techniques have sometimes lacked the visual quality and realism demanded by users. Extra user time and processing and memory resources have been expended on retouching, to attempt to produce textured meshes of the desired quality. This has slowed adoption of SfM photogrammetry in modeling workflows, for example, in infrastructure modeling workflows.

Accordingly, there is a need for improved techniques for texturing a mesh (e.g., a 3D polygon mesh) based on source images (e.g., photographs) of a scene in the physical environment.

SUMMARY

In various example embodiments, a variational technique is provided for texturing a mesh (e.g., a 3D polygon mesh) based on source images (e.g., photographs) of a scene in the physical environment. The technique combines information from multiple source images to generate a texture map with patches that are the most similar to corresponding patches of the source images. The texture map may be the direct result of an optimization that jointly searches for the texture map and patch correspondence, which is initially unknown. The optimization may use a variational formulation that scores every possible texture map using an energy function that includes a matching term and a regularization term. In operation, the variational technique may mimic the behavior of human vision (which is very sensitive to local color variations but insensitive to absolute color values or variations over long distances). The resulting texture map may thereby be perceived to have high visual quality and realism, while being able to be produced by computing devices efficiently (e.g., in terms of processing and memory resource utilization).

In one specific example embodiment, a texturing process of an application (e.g., a SfM photogrammetry application) executing on one or more computing devices accesses a plurality of source images of a scene in the physical environment and an un-textured version of a mesh. The texturing process performs an optimization to jointly search for a texture map and patch correspondence between patches of the texture map and patches of the source images. The optimization minimizes an energy function that includes a matching term that quantifies how similar patches of the texture map are to corresponding patches of the source images, and a regularization term that quantifies how complex the patch correspondence is. Correspondence may be evaluated using a correspondence density function that permits a patch of the texture map to correspond to a plurality of patches in different ones of the source images. Similarity may be evaluated using a patch similarity matching function that considers exposure in addition to color values. The application applies the texture map to the un-textured version of the mesh to produce a textured version of the mesh, which may be displayed in a user interface of the application on a display screen, stored to a storage system and/or otherwise utilized.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Figure 1:
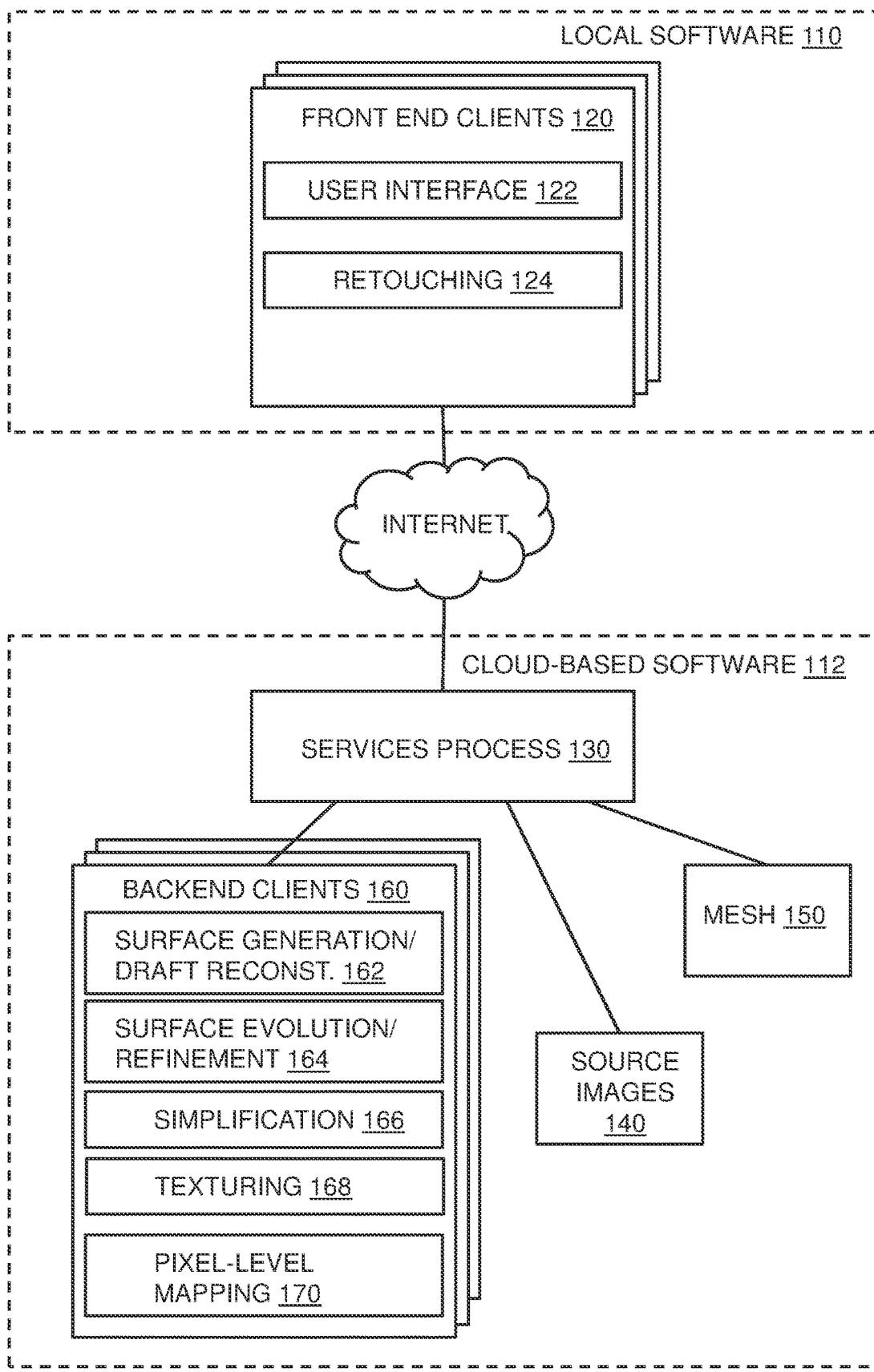
FIG. 1 is a high-level block diagram of an example cloud-based processing architecture for a SfM photogrammetry application.

FIG. 1 is a high-level block diagram of an example cloud-based processing architecture 100 for a SfM photogrammetry application. In the example cloud-based processing architecture 100, local software 110 executes on computing devices (or other electronic devices) local to an end-user (collectively "local devices") and cloud-based software 112 executes on one or more computing devices (or other electronic devices) remote from the end-user (collectively "cloud computing devices"), accessible via a network (e.g., the Internet). Each computing device may include processors, memory, storage systems, display screens, and other hardware (not shown). The local software 110 may include frontend clients 120, each operating on a different local device. The frontend clients 120 may, among a variety of other functionality, provide a user-interface to the SfM photogrammetry application usable to receive source data including source images (e.g., photographs) 140 captured by a camera (not shown), display textured meshes generated from the source images 140 and/or other source data, and receive user input directing retouching of the textured meshes. To that end, frontend clients 120 may include user interface processes 122, retouching processes 124, as well as other software processes.

The cloud-based software 112 may include backend clients 160 that perform reconstruction, texturing and annotating, as well as other resource intensive operations (e.g., other processing and memory resource intensive operations). To that end, backend clients 160 may include surface generation/draft reconstruction processes 162, surface evolution/refinement processes 164, simplification processes 166, texturing processes 168, pixel-level mapping processes 170 as well as other software processes. To improve performance, the backend clients 160 may each be executed on different cloud computing devices. In some cases, the backend clients 160 may be executed as different threads, such that they operate independently even when executed on the same cloud computing device. The frontend clients 120 and backend client 160 (collectively "clients") may perform at least some operations concurrently, to take advantage of the efficiencies of parallel processing.

A services process 130 functionally organizes the SfM photogrammetry application, managing interaction among the clients 120, 160 and their processes and managing access to the source images 140 and mesh 150. Access that involves reading alone may be conducted in a "read-only" mode without having to acquire a lock. Access that involves writing typically may require clients 120, 160 to obtain a lock. Locks may be of multiple different types, depending on the nature of the operations to be performed.

It should be understood that while a cloud-based processing architecture 100 is shown, a variety of other software architectures may alternatively be employed. For example, a stand-alone architecture may be employed, where user-interface functionality and processing operations are all implemented as part of the same local software application. In such an architecture, all of the above described software processes may execute on the same local device.

Figure 2:
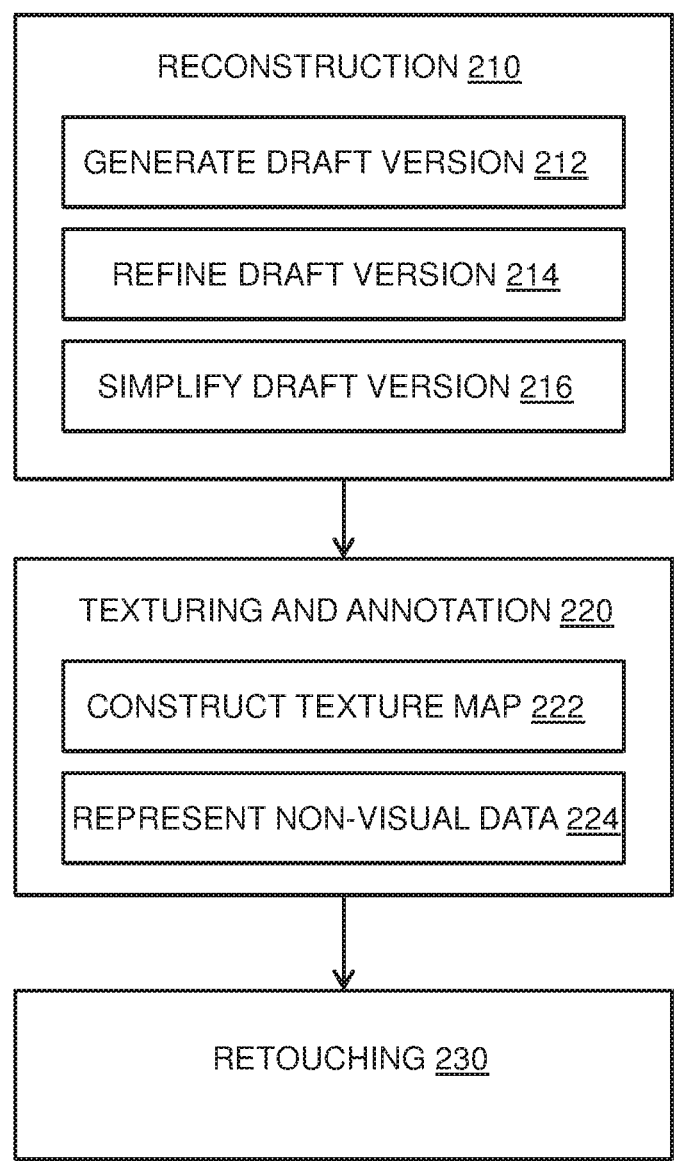
FIG. 2 is a flow diagram of an example sequence of steps for a producing a textured mesh that may be performed by the SfM photogrammetry application.

FIG. 2 is a flow diagram of an example sequence of steps for a producing a textured mesh that may be performed by the SfM photogrammetry application. Such sequence of steps assumes use of the cloud-based processing architecture 100 of FIG. 1, but may be readily adapted to a stand-alone architecture.

At step 210, one or more backend clients 160 perform reconstruction operations on the source images 140 and/or other source data. As part of reconstruction, at sub-step 212, a surface generation/draft reconstruction process 162 generates a draft version of triangulated surfaces. Draft reconstruction may be performed by an algorithm, such as the Floating-Scale Surface Reconstruction algorithm, that reconstructs discrete parts of the surface in parallel. At sub-step 214, a surface evolution/refinement process 164 refines the draft version to produce a refined faceted (e.g., triangulated) surface. The surface may be refined in parts. Further, at sub-step 216, the simplification process 166 simplifies the refined surface to eliminate facets that do not meaningfully contribute. Simplification may also be performed in parts.

At step 220, one or more backend clients 160 perform texturing and annotation operations. As part of texturing and annotation, at sub-step 222, a texturing process 168 constructs a texture map that indicates textures to be applied to the mesh. As explained in more detail below, the texturing process 168 may employ a variational technique that combines information from multiple source images 140 to generate a texture map with patches that are the most similar to corresponding patches of the source images 140. As used herein, the term "patch" refers to a portion of a mesh (e.g., around a particular point) or to a corresponding set of pixels associated with the mesh. The corresponding pixels may be pixels of the source images. At sub-step 224, a pixel-level mapping process 170 generates representations for non-visual data (e.g., environmental data such as temperature data, resolution data, etc.) and adds these to the mesh.

At step 230, one or more frontend clients 120 perform retouching operations to edit the mesh based on user-indicated changes to geometry and textures. During the sequence of steps, efficiency may be increased by having multiple clients 120, 160 concurrently perform operations, such that different parts are edited in parallel.

As mentioned above, particular challenges may be encountered in generating the textures to apply to the mesh 150. To address this, the texturing process 168 may employ a variational technique that combines information from multiple source images 140 to generate a texture map with patches that are the most similar to corresponding patches of the source images. To generate the texture map in this manner, a number of technical challenges are encountered.

A first challenge is that correspondence between a patch of the texture map and patches of the sources images 140 may not be known. While the texturing process 168 may be able to determine roughly where a patch of the texture map corresponds to in a given source image, the exact location may be unknown due to occlusions, inaccurate estimations of the position and origination of the camera which captured the source image, deficiencies in the source image (e.g., blur, noise, poor exposure, etc.), and/or other factors. The texturing process 168 may address this challenge, at least in part, by jointly searching for the texture map and unknown patch correspondence.

A second challenge is formulating the objective in a manner that may be solved efficiently (e.g., in terms of processing and memory) by a computing device. The texturing process 168 may address this challenge, at least in part, by quantifying the objective using a variational formulation that scores every possible texture map using an energy function that includes a matching term that quantifies how similar patches of the texture map are to the corresponding patches of the source images 140, and a regularization term that quantifies how complex the patch correspondence is. In one formulation, a lower value to the energy function may indicate more similarity/correspondence. In such a formulation, the optimum value of the energy function may be a lowest value, and the texturing process 168 may minimize the energy function by looking for the lowest value, to yield the texture map output. It should be understood that, in other formulations of the energy function, the optimum value may be a highest value. According, the term "minimize" should be understood to refer to a search for an optimum value, which may be the lowest or highest numerically, depending on the formulation of the energy function.

A third challenge is quantifying the notion of similarity. The texturing process 168 may address this challenge by using a patch similarity matching function that considers exposure in addition to color values. The patch similarity matching function may be an adaptation of zero-mean normalized cross-correlation (ZNCC) with these properties.

Figure 3:
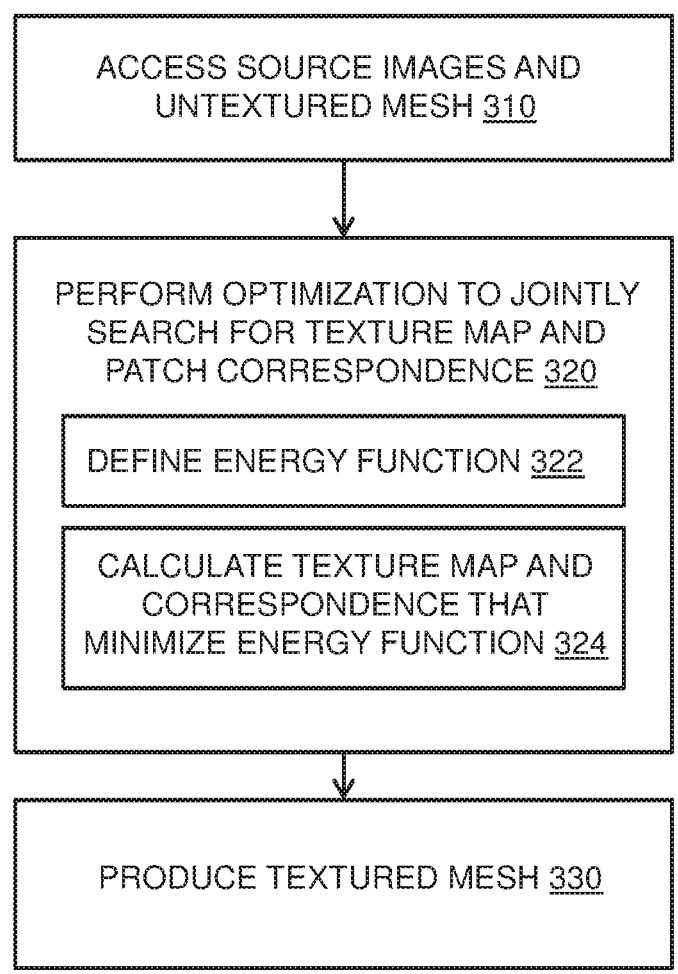
FIG. 3 is a flow diagram of an example sequence of steps that may be performed by a texturing process of the SfM photogrammetry application to implement a variational technique for texturing a mesh.

FIG. 3 is a flow diagram of an example sequence of steps that may be performed by the texturing process 168 of the SfM photogrammetry application to implement a variational technique for texturing a mesh 150. At step 310, the texturing process 168 accesses the source images 140 and an un-textured version of the mesh. At step 320, the texturing process 168 performs an optimization to jointly search for a texture map and patch correspondence. The optimization may include a number of sub-steps, which may be performed substantially concurrently. At sub-step 322, the texturing processes 168 defines an energy function that includes a matching term that quantifies how similar patches of the texture map are to the corresponding patches of the source images 140, and a regularization term that quantifies how complex the patch correspondence is. Equation 1 below is an example energy function that may be used in an example implementation. The example energy function assumes that the mesh is a 2D mesh and that the source images are defined over a continuous domain. However, it should be apparent that the energy function may be readily reformulated for use with a 3D mesh or for non-continuously defined images. The example energy function is given as:

$$E(O,\varphi) = \int_\Omega \Sigma_i \int_{I_i} W_i(y) \varphi_i(x,y) M(P_{O,x}, P_{I_i,y}) dy dx - T \int_\Omega \Sigma_i \int_{\Omega_i} \varphi_i(x,y) \log \varphi_i(x,y) dy dx \quad (1)$$

such that $\forall x, \Sigma_i \int_{\Omega_i} \varphi_i(x,y) dy = 1$ where $I_i$ are the source images, $\Omega_i$ is the image domain, $O$ is the texture map over $\Omega$, $W_i$ is a weight, $P_{I_i,y}$ is a patch of the source image centered on y, $P_{O,x}$ is a patch of texture map centered on x, M is a patch similarity matching function, $\varphi_i$ is a correspondence density function with $\varphi_i: \Omega \times \Omega_i \to \mathbb{R}^+$, and T is a temperature factor.

As can be seen from the first term of Equation 1 (the matching term), the equation quantifies how similar patches of the texture map are to the corresponding patches of the source images 140 with an integral over the texture map of the sum over the source images of the similarity between corresponding patches. The correspondence is not necessarily one-to-one for each image position. Instead, one patch in the texture map may correspond to patches in multiple source images 140, with correspondence being evaluated using a correspondence density function.

The patch similarity matching function which measures similarity may be an adaptation of a zero-mean normalized cross-correlation (ZNCC) function, which considers exposure in addition to color values. With a traditional ZNCC function, darker and lighter versions may be considered identical to an original image. The hybrid ZNCC may combine a traditional ZNCC with a sum of squared differences (SSD), varying between the two based on a parameter $\alpha$. The traditional ZNCC and SSD should be made homogeneous before are mixed. The result is a function that is relatively insensitive to exposure changes, but still favors corresponding patches that are close in terms of exposure. An example hybrid ZNCC function may be given as:

$$M = \alpha \Sigma (I_1 - I_2)^2 + (1-\alpha) \Sigma \left[ (I_1 - \mu_1) - \frac{\sigma_1}{\sigma_2}(I_2 - \mu_2) \right]^2 \quad (2)$$

$$M = \alpha SSD + 2(1-\alpha)\sigma_1^2(1 - ZNCC)$$

where $\alpha$ is the weighting factor controlling the trade-off between SSD and ZNCC, $\mu_i$ is the average and $\sigma_i$ is the standard deviation of the two image patches, and the remaining variables are as defined as above.

As can be seen from the second term of Equation 1 (the regularization term), the equation quantifies how complex the patch correspondence is with an integral over the texture map of the sum over the source images of entropy of the correspondence density function. Again, the term does not require a one-to-one mapping, but may permit a one-to-many mapping.

The second term (regularization term) is weighted by a temperature factor that indicates how much emphasis is placed on simplicity of correspondence. As can be seen, there may be a trade off between similarity evaluated by the first term (the matching term), and the how simple or complex the matching is allowed to be evaluated by the second term (the regularization term). The temperature factor regulates how this trade off is balanced.

At sub-step 324, the texturing process 168 calculates values of the texture map and the unknown correspondence that minimize the energy function. The texturing processes 168 may employ an alternate minimization algorithm that first minimizes by adjusting correspondence for a fixed texture map, and then minimizes by adjusting the texture map for a fixed correspondence. Returning to the example implementation discussed above that utilizes the example energy function of Equation 1, the alternate minimization algorithm may first minimize using correspondence by solving a closed form equation, such as:

$$\varphi_i(x,y) \propto \left[-\frac{1}{T}W_i(y)M(P_{O,x}, P_{l_i,y})\right] \quad (3)$$

where the variables are defined as above. The alternate minimization algorithm may then minimize by adjusting the texture map using numerical methods. Numerical methods may be relied upon when no closed form equation can be formulated.

In some implementations, the alternate minimization algorithm may utilize simulated annealing techniques that gradually decrease the temperature factor during a series of time steps, to eventually reach a local-minimum that approximates a global minimum of the energy function. Simulated annealing is a metaheuristic that is used to explore a solution space. Initially temperature may be set to a large value (e.g., $T=+\infty$) such that the correspondence is initially allowed to be very complex. For a large temperature, the energy function is convex and admits a closed-form global minimum. During the search, the temperature factor is progressively decreased (e.g., $T \to 0^+$), such that the correspondence becomes more selective. As the temperature factor decreases, the energy function is less convex and the prevalence of local minima increases.

The texturing process 168 produces a texture map. At step 330, the texture map is applied to the un-textured mesh to produce a textured version thereof. The textured mesh may then be displayed to a user on a display screen by user interface processes 122, stored to a storage system for subsequent use and/or otherwise utilized.

It should be understood that various adaptations and modifications may be readily made to what is described above, to suit various implementations and environments. While it is discussed above that many aspects of the techniques may be implemented by specific software processes or on specific hardware devices, it should be understood that some or all of the techniques may also be implemented by different software on different hardware. In addition to general-purpose computing devices/electronic devices, the hardware may include specially configured logic circuits and/or other types of hardware components. Above all, it should be understood that the above descriptions are meant to be taken only by way of example.

What is claimed is:

1. A method for texturing a mesh, comprising:
accessing, by a texturing process of an application executing on one or more computing devices, a plurality of source images of a scene in the physical environment and an un-textured version of the mesh;
performing, by the texturing process, an optimization that jointly searches for a texture map and a patch correspondence between patches of the texture map and patches of the source images, the optimization to examine a plurality of possible texture maps and possible patch correspondences and to select the texture map and the patch correspondence that minimizes an energy function, wherein a value of the energy function is based on a combination of
a matching term that uses a cross-correlation function to quantify how similar patches of a possible texture map of the plurality of possible texture maps are to the corresponding patches of the source images, and
a regularization term that uses a density function to quantify how complex a possible patch correspondence of the plurality of patch correspondences is between the patches of the texture map and the corresponding patches of the source images;
applying the texture map to the un-textured version of the mesh to produce a textured version of the mesh; and
displaying the textured version of the mesh in a user interface of the application on a display screen of at least one of the one or more computing devices.

2. The method of claim 1, wherein the density function is a correspondence density function.

3. The method of claim 1, wherein the cross-correlation function is a hybrid zero-mean normalized cross-correlation (ZNCC) function that considers both exposure and color values.

4. The method of claim 1, wherein the regularization term is scaled by a temperature factor, the temperature factor being a value that is multiplied with the regularization term to indicate how much emphasis is placed on complexity of the patch correspondence.

5. The method of claim 1, wherein the performing the optimization utilizes an alternate minimization algorithm that first minimizes by adjusting patch correspondence for a fixed texture map and then minimizes by adjusting the texture map for a fixed patch correspondence.

6. The method of claim 4, wherein the performing the optimization utilizes an alternate minimization algorithm that first minimizes by adjusting patch correspondence for a fixed texture map and then minimizes by adjusting the texture map for a fixed patch correspondence, and the alternate minimization algorithm utilizes simulated annealing to decrease the temperature factor during a series of time steps, to eventually reach a local-minimum that approximates a global minimum of the energy function.

7. The method of claim 1, wherein the application is a structure from motion (SfM) photogrammetry application, and the mesh is generated from the plurality of images by SfM photogrammetry.

8. A computing device comprising:
a processor; and
a memory coupled to the processor and configured to store a plurality of source images of a scene in the physical environment, a structure from motion (SfM) photogrammetry application, and a mesh generated from the plurality of source images by the SfM application, the SfM application including a texturing process that determines textures for the mesh, the texturing process when executed by the processor operable to:

access the plurality of source images and an un-textured version of the mesh;

perform an optimization that jointly searches for a texture map and a patch correspondence between patches of the texture map and patches of the source images, the optimization to examine a plurality of possible texture maps and possible patch correspondences and to select the texture map and the patch correspondence that minimizes an energy function, wherein a value of the energy function is based on a combination of a matching term that uses a cross-correlation function to quantify how similar patches of a possible texture map of the plurality of possible texture maps are to corresponding patches of the source images, and a regularization term that uses a density function to quantify how complex a possible patch correspondence of the plurality of patch correspondences is between the patches of the texture map and the corresponding patches of the source images;

apply the texture map to the un-textured version of the mesh to produce a textured version of the mesh; and store the textured version of the mesh.

9. The computing device of claim 8, wherein the density function is a correspondence density function.

10. A non-transitory electronic-device readable medium having instructions stored thereon, the instructions when executed by one or more electronic-devices operable to:

access a plurality of source images of a scene in the physical environment and an un-textured version of a mesh, the plurality of source images including patches which have initially unknown correspondence to patches of a texture map for the mesh;

perform an optimization that jointly searches for the texture map and a patch correspondence, the optimization to examine a plurality of possible texture maps and possible patch correspondences and to select the texture map and the patch correspondence that minimizes an energy function, wherein a value of the energy function is based on a combination of a matching term that uses a cross-correlation function to quantify how similar patches of a possible texture map of the plurality of possible texture maps are to corresponding patches of the source images, and a regularization term that uses a density function to quantify how complex a patch correspondence of the plurality of patch correspondences is between the patches of the texture map and the corresponding patches of the source images;

apply the texture map to the un-textured version of the mesh to produce a textured version of the mesh; and display the textured version of the mesh on a display screen to a user.

11. The non-transitory electronic-device readable medium of claim 10, wherein the density function is a correspondence density function.

12. The non-transitory electronic-device readable medium of claim 10, wherein the cross-correlation function is a hybrid zero-mean normalized cross-correlation (ZNCC) function that considers both exposure and color values.

13. The non-transitory electronic-device readable medium of claim 10, wherein the regularization term is scaled by a temperature factor, the temperature factor being a value that is multiplied with the regularization term to indicate how much emphasis is placed on complexity of the patch correspondence.

14. The non-transitory electronic-device readable medium of claim 10, wherein the instructions that when executed are operable to perform the optimization are operable to utilize an alternate minimization algorithm that first minimizes by adjusting patch correspondence for a fixed texture map and then minimizes by adjusting the texture map for a fixed patch correspondence.

15. The non-transitory electronic-device readable medium of claim 14, wherein the regularization term is scaled by a temperature factor, the temperature factor being a value that is multiplied with the regularization term to indicate how much emphasis is placed on complexity of the patch correspondence, and the alternate minimization algorithm utilizes simulated annealing to decrease the temperature factor during a series of time steps, to eventually reach a local-minimum that approximates a global minimum of the energy function.

16. The non-transitory electronic-device readable medium of claim 10, wherein the instructions are further operable to:

generate the mesh from the plurality of source images using structure from motion (SfM) photogrammetry.

* * * * *